US007555122B2

(12) United States Patent
Möller et al.

(10) Patent No.: US 7,555,122 B2
(45) Date of Patent: Jun. 30, 2009

(54) METHOD FOR ELLIPTIC CURVE POINT MULTIPLICATION

(75) Inventors: Bodo Möller, Darmstadt (DE); Tsuyoshi Takagi, Hofheim-Wallau (DE)

(73) Assignee: Wired Communications LLC, Wilmington, DE (US)

( * ) Notice: Subject to any disclaimer, the term of this patent is extended or adjusted under 35 U.S.C. 154(b) by 503 days.

(21) Appl. No.: 10/310,735

(22) Filed: Dec. 4, 2002

(65) Prior Publication Data

US 2004/0114756 A1 Jun. 17, 2004

(51) Int. Cl.
*H04K 1/00* (2006.01)
(52) U.S. Cl. ........................................ 380/30
(58) Field of Classification Search ............ 708/7, 708/103, 523; 380/30
See application file for complete search history.

(56) References Cited

U.S. PATENT DOCUMENTS

| | | | | |
|---|---|---|---|---|
| 6,631,471 | B1 * | 10/2003 | Ohki et al. ............... | 713/193 |
| 2001/0048741 | A1 | 12/2001 | Okeya | |
| 2002/0178371 | A1 * | 11/2002 | Kaminaga et al. .......... | 713/189 |
| 2003/0194086 | A1 * | 10/2003 | Lambert ................... | 380/44 |

FOREIGN PATENT DOCUMENTS

| | | |
|---|---|---|
| EP | 0 924 895 A2 | 12/1998 |
| EP | 1 014 617 A2 | 12/1999 |
| EP | 1160 661 A2 | 12/2001 |
| EP | 1160 661 A3 | 12/2001 |
| FR | 2 810 821 A1 | 6/2000 |
| JP | 2000187438 A | 12/1998 |
| WO | WO 00/05837 A1 | 2/2000 |
| WO | WO 00/25204 A1 | 4/2000 |
| WO | WO 02/054343 A1 | 7/2002 |

OTHER PUBLICATIONS

Securing Elliptic Curve Pointy Multiplication against Side-Channel Attacks, Bodo Moller, Information Security—ISC 2001.*
Parallelizable Elliptic Curve Point Multiplication Method with Resistance against Side-Channel Attacks, ISC 2002.*
An Implementation of Elliptic Curve Cryptosystem over F 2 155, G.B. Agnew, S.A. Vansone, IEEE JSAC, No. 5 Jun. 1993.*
Goubin, Louis, "A Refined Power-Analysis Attack on Elliptic Curve Cryptosystems", Y.G. Desmedt (Ed.): PKO 2003, LNCS 2567, pp. 199-211, Springer-Berlag Berlin Heidelberg 2003.
IEEE Explore, "Power analysis attacks and algorithmic approaches to their countermeasures for Koblitz curve cryptosystems", by M.A. Hasan, 2001 IEEE, vol. 50, No. 10, (Oct. 2001), pp. 1071-1083.
Joye, Marc, et al., "Protections against Differential Analysis for Elliptic Curve Cryptography—An Algebraic Approach—", Springer-Verlag Heidelberg, ISSN: 0302-9743, vol. 2162/2001, pp. 377-390.
Kocher, P.C. "Timing attacks on implementations of Diffie-Hellman, RSA, DSS, and other systems." *IAdvances in Cryptology*—Crypto '96 (1996), N. Koblitz, Ed., vol. 1109 of Lecture Notes in Computer Science, pp. 104-113.

Kocher, P., Jaffe, J., and Jun, B. "Differential power analysis." *Advances in Cryptology*—Crypto '99 (1999), M. Wiener, Ed., vol. 1666 of Lecture Notes in Computer Science, pp. 388-397.
Coron, J.-S. "Resistance against differential power analysis for elliptic curve cryptosystems." *Cryptographic Hardware and Embedded Systems*—CHES '99 (1999), C.K. Koç and C. Paar, Eds., vol. 1717 of Lecture Notes in Computer Science, pp. 292-302.
Möller, B. "Securing elliptic curve point multiplication against side-channel attacks." *Information Security*—ISC 2001 (2001), G. I. Davida and Y. Frankel, Eds., vol. 2200 of Lecture Notes in Computer Science , pp. 324-334.
Montgomery, P.L. "Speeding the Pollard and elliptic curve methods of factorization." *Mathematics of Computation*, vol. 48, No. 177 (1987), 243-264.
Brier, E., and Joye, M. "Weierstraβ elliptic curves and side-channel attacks." *Public Key Cryptography*—PKC 2002 (2002), D. Naccache and P. Paillier, Eds., vol. 2274 of Lecture Notes in Computer Science, pp. 335-345.
Izu, T., and Takagi, T. "A fast parallel elliptic curve multiplication resistant against side channel attacks." *Public Key Cryptography*—PKC 2002 (2002), D. Naccache and P. Paillier, Eds., vol. 2274 of Lecture Notes in Computer Science, pp. 280-296.
Fischer, W., Giraud, C., Knudsen, E.W., and Seifert, J.-P. "Parallel scalar multiplication on general elliptic curves over Fp hedged against non-differential side-channel attacks." *Cryptology ePrint Archive Report* 2002/007, 2002. Available from http://eprint.iacr.org/.
Möller, B. "Securing elliptic curve point multiplication against side-channel attacks, addendum: Efficiency improvement." http://www.informatik.tu-darmstadt.de/TI/Mitarbeiter/moeller/ecc-sca-isc01.pdf, 2001.
Walter, C.D., and Thompson, S. "Distinguishing exponent digits by observing modular subtractions." *Progress in Cryptology*—CT-RSA 2001 (2001), D. Naccache, Ed., vol. 2020 of Lecture Notes in Computer Science, pp. 192-207.
Schindler, W. "A combined timing and power attack." *Public Key Cryptography*—PKC 2002 (2002), D. Naccache and P. Paillier, Eds., vol. 2274 of Lecture Notes in Computer Science, pp. 263-297.
Brickell, E.F., Gordon, D.M., McCurley, K.S., and Wilson, D.B. "Fast exponentiation with precomputation (extended abstract)." *Advances in Crypotology*—Eurocrypt '92 (1993), R.A. Rueppel, Ed., vol. 658 of Lecture Notes in Computer Science, pp. 200-207.
Itoh, K., Takenaka, M., Torii, N., Temma, S., and Kurihara, Y. "Fast implementation of public-key cryptography on a DSP TMS320C6201." *Cryptographic Hardware and Embedded Systems*—CHES '99 (1999), C.K. Koç and C. Paar, Eds., vol. 1717 of Lecture Notes in Computer Science, pp. 61-72.
Möller, B. "Parallelizable elliptic curve point multiplication method with resistance against side-channel attacks." *Information Security*—ISC 2002 (2002) A.H. Chan and V. Gligor, Eds., vol. 2433 of Lecture Notes in Computer Science, pp. 402-413.

(Continued)

*Primary Examiner*—Kristine Kincaid
*Assistant Examiner*—Farid Homayounmehr
(74) *Attorney, Agent, or Firm*—Woodcock Washburn LLP

(57) ABSTRACT

The method comprises three stages. In the first stage, randomly selected point representations are stored in variables. In the second stage, a right-to-left loop is executed that modifies the variable values in dependency of a multiplier. In the last stage, the result is calculated from the modified variable values.

16 Claims, No Drawings

OTHER PUBLICATIONS

Kocher, P. C. Timing attacks on implementations of Dif-fie-Hellman, RSA, DSS, and other systems. In Advance in Cryptology—Crypto '96 (1996), N. Koblitz, Ed., vol. 1109 of Lecture Notes in Computer Science, pp. 104-113.

Kocher, P. C., Jaffe, J., and Jun, B. Differential power anlysis. In Advances in Crytology—Crypto '99 (1999), M. Wiener, Ed., vol. 1666 of Lecture Notes in Computer Sci-ence, pp. 388-397.

Coron, J.-S. Resistance against differential power analy-sis for elliptic curve cryptosystems. In Cryptographic Hardware and Embedded Systems—CHES '99 (1999), C. K. Koc and C. Paar, Eds., vol. 1717 of Lecture Notes in Com-puter Science, pp. 292-302.

Möller, B. Securing elliptic curve point multiplication against side-channel attacks. In Information Security—ISC 2001 (2001), G.I. Davida and Y. Frankel, Eds., vol. 2200 of Lecture Notes in Computer Science, pp. 324-334.

Montgomery, P. L. Speeding the Pollard and elliptic curve methods of factorization. Mathematics of Computation 48 (1987), 243-264.

Bier, E., and Joye, M. Weierstraβ elliptic curves and side-channel attacks. In Public Key Cryptography—PKC 2002 (2002), D. Nac-cache an P. Paillier, Eds., vol. 2274 of Lecture Notes in Computer Science, pp. 335-345.

Izu, T., and Takagi, T. A fast parallel elliptic curve multiplication resistant against side channel attacks. In Public Key Cryptography—PKC 2002 (2002), D. Naccache an P. Paillier, Eds., vol. 2274 of Lecture Notes in Copmputer Science, pp. 280-296.

Fischer, W., Giraud, C., Knudsen, E. W., and Jean-Pierre, S. Parallel scalar multiplication on general elliptic curves over Fp hedged against non-differential side-channel attacks. Cryptology ePrint Archive Report 2002/007, 2002. Available from http://eprint/iacr.org/.

Möller, B. Securing elliptic curve point multiplication against side-channel attacks, addendum: Efficiency im-provement. http://www.informatik.tu-darmstadt.de/TI/Mitarbeiter/moeller/ecc-sca-isc01.pdf, 2001.

Walter, C. D., and Thompson, S. Distinguishing exponent digits by observing modular subtractions. In Progress in Cryptology—CT-RSA 2001 (2001), D. Naccache, Ed., vol. 2020 of Lecture Notes in Vomputer Science, pp. 192-207.

Schindler, W. A combined timing and power attack. In Pub-lic Key Cryptography—PKC 2002 (2002), D. Naccache an P. Paillier, Eds., vol. 2274 of Lecture Notes in Computer Science, pp. 263-297.

Yao, A. C.-C. On the evaluation of powers. SIAM Journal on Computing 5 (1976), 100-103.

Knuth, D. E. The Art of Computer Programming—vol. 2: Seminumerical Algorithms (2nd ed.). Addison-Wesley, 1981.

Knuth, D. E. The Art of Computer Programming—vol. 2: Seminumerical Algorithms (3rd ed.). Addison-Wesley, 1998.

Brickell, E. F., Gordon, D. M., McCurley, K. S., and Wil-son, D. B. Fast exponentiation with precomputation. In Advances in Cryptology—Eurocrypt '92 (1993), R. A. Rueppel, Ed., vol. 658 of Lecture Notes in Computer Sci-ence, pp. 200-207.

Institut of Electrical and Electronics Engineers (IEEE). IEEE standard specifications for public-key cryptography. IEEE Std 1363-2000, 2000.

Itoh, K., Takenaka, M., Torii, N., Temma, S., and Kuri-Hara, Y. Fast implementation of public-key cryptography on a DSP TMS320C6201. In Cryptographic Hardware and Em-bedded Systems—CHES '99 (1999), C. K. Koc and C. Paar, Eds., vol. 1717 of Lecture Notes in Computer Science, pp. 61-72.

Möller, B. Parallelizable Elliptic Curve Point Mul-tiplikation Method with Resistance against Side-Channel Attacks. In Information Security—ISC 2002 (2002), Agnes Hui Chan, Virgil Gligor, Eds., vol. 2433 of Lecture Notes in Computer Scinece, pp. 402-413.

* cited by examiner

METHOD FOR ELLIPTIC CURVE POINT MULTIPLICATION

TECHNICAL FIELD OF THE INVENTION

The invention describes an elliptic curve point multiplication method with resistance against side-channel attacks, which are a big threat for use in cryptography, e.g. for key exchange, encryption, or for digital signatures.

PRIOR ART

Implementations of elliptic curve cryptosystems may be vulnerable to side-channel attacks ([1],[2]) where adversaries can use power consumption measurements or similar observations to derive information on secret scalars e in point multiplications eP.

One distinguishes between differential side-channel attacks, which require correlated measurements from multiple point multiplications, and simple side-channel attacks, which directly interpret data obtained during a single point multiplication. Randomisation can be used as a countermeasure against differential side-channel attacks.

In particular, for elliptic curve cryptography, projective randomisation is a simple and effective tool ([3]):

If (X,Y,Z) represents the point whose affine coordinates are $(X/Z^2, Y/Z^3)$ another representation of the same point that cannot be predicted by the adversary is obtained by substituting $(r^2X, r^3Y, rZ)$ with a randomly chosen secret non-zero field element r. (When starting from an affine representation (X,Y), this simplifies to $(r^2X, r^3Y, r)$.)

Simple side-channel attacks can be easily performed because usually the attacker can tell apart point doublings from general point additions.

Thus point multiplication should be implemented using a fixed sequence of point operations that does not depend on the particular scalar.

Note that it is reasonable to assume that point addition and point subtraction are uniform to the attacker as point inversion is nearly immediate (dummy inversions can be inserted to obtain the same sequence of operations for point additions as for point subtractions).

Various point multiplication methods have been proposed that use an alternating sequence of doublings and additions:

The simplest approach uses a binary point multiplication method with dummy additions inserted to avoid dependencies on scalar bits ([3]); however as noted in [4] it may be easy for adversaries to determine which additions are dummy operations, so it is not clear that this method provides sufficient security. For odd scalars, a variant of binary point multiplication can be used where the scalar is represented in balanced binary representation (digits −1 and +1) ([5]). Also Montgomery's binary point multiplication method ([6]), which maintains an invariant $Q_1-Q_0=P$ while computing eP using two variables $Q_0$, $Q_1$, can be adapted for implementing point multiplication with a fixed sequence of point operations ([7], [8], [9], [10], [11]).

With this approach, specific techniques can be used to speed up point arithmetic:

The doubling and addition steps can be combined; y-coordinates of points may be omitted during the computation ([6],[9],[10],[11]); and on suitable hardware, parallel execution can be conveniently used for improved efficiency ([10], [11]).

All of the above point multiplication methods are binary. Given sufficient memory, efficiency can be improved by using $2^w$-ary point multiplication methods. Here, the scalar e is represented in base $2^w$ using digits $b_i$ from some digit set B:

$$e = \sum_{0 \leq i \leq l} b_i 2^{wi}$$

A simple way to obtain a uniform sequence of doublings and additions (namely, one addition after w doublings in the main loop of the point multiplication algorithm) is to use $2^w$-ary point multiplication as usual (first compute and store bP for each b∈B, then compute eP using this precomputed table), but to insert a dummy addition whenever a zero digit is encountered.

However, as noted above for the binary case, the dummy addition approach may not be secure.

This problem can be avoided (given w≧2) by using a representation of e without digit value 0, such as $$B=\{-2^w, 1, 2, \ldots, 2^w-1\}$$

as proposed in [4], or $$B=\{-2^w, \pm 1, \pm 2, \ldots, \pm(2^w-2), 2^w-1\}$$

for improved efficiency as proposed in [12].

A remaining problem in the method of [4] and [12] is that the use of a fixed table may allow for statistical attacks: If the same point from the table is used in a point addition whenever the same digit value occurs, this may help adversaries to find out which of the digits $b_i$ have the same value (cf. the attacks on modular exponentiation using fixed tables in [13] and [14]).

This problem can be countered by performing, whenever the table is accessed, a projective randomisation of the table value that has been used.

This will avoid a fixed table, but at the price of reduced efficiency.

BACKGROUND OF THE INVENTION

This invention is a variant of $2^w$-ary point multiplication with resistance against side-channel attacks that avoids a fixed table without requiring frequently repeated projective randomisation.

An additional advantage of the new method is that it is easily parallelizable on two-processor systems. One essential change in strategy compared with earlier methods for side-channel attack resistant point multiplication is the use of a right-to-left method (the scalar is processed starting at the least significant digit, cf. [15]) whereas the conventional methods work in a left-to-right fashion.

The method works in three stages, which are called initialisation stage, right-to-left stage, and result stage.

First there will be a high-level view of these stages before they are discussed in detail.

The method for computing eP is parameterized by an integer w≧2 and a digit set B consisting of $2^w$ integers of small absolute value such that every positive scalar e can be represented in the form $$e = \sum_{0 \leq i \leq l} b_i 2^{wi}$$

using digits $b_1 \in B$; for example $$B = \{0, 1, \ldots, 2^w - 1\}$$

or $$B = \{-w^{w-1}, \ldots, 2^{w-1} - 1\}$$

A representation of e using the latter digit set can be easily determined on the fly when scanning the binary digits of e in right-to-left direction.

If e is at most n bits long (i.e. $0 < e < 2^n$), $l = \lfloor n/w \rfloor$ is sufficient.

Let B' denote the set $\{|b| \mid b \in B\}$ of absolute values of digits, which has at least $2^{\{w-1\}} + 1$ and at most $2^w$ elements. The point multiplication method uses #(B')+1 variables for storing points on the elliptic curve in projective representation: Namely, one variable $A_b$ for each $b \in B'$, and one additional variable Q.

Let $A_b^{init}$ denote the value of $A_b$ at the end of the initialisation stage, and let $A_b^{sum}$ denote the value of $A_b$ at the end of the right-to-left stage. The initialisation stage sets up the variables $A_b (b \in B')$ in a randomized way such that $A_b^{init} \neq 0$ for each b, but $$\sum_{b \in B'} b A_b^{init} = 0$$

(O denotes the point at infinity, the neutral element of the elliptic curve group.)

Then the right-to-left stage performs computations depending on P and the digits $b_1$, yielding new values $A_b^{sum}$ of the variables $A_b$ satisfying $$A_b^{sum} = A_b^{init} + \sum_{\substack{0 \le i \le l \\ b_i = b}} 2^{wi} P - \sum_{\substack{0 \le i \le l \\ b_i = -b}} 2^{wi} P$$

for each $b \in B'$. Finally, the result stage computes $$\sum_{b \in B' - \{0\}} b A_b^{sum},$$

which yields the final result eP because $$\sum_{b \in B' - \{0\}} b A_b^{sum} = \underbrace{\sum_{b \in B' - \{0\}} b A_b^{init}}_{0} +$$

$$\sum_{b \in B' - \{0\}} b \left( \sum_{\substack{0 \le i \le l \\ b_i = b}} 2^{wi} P - \sum_{\substack{0 \le i \le l \\ b_i = -b}} 2^{wi} P \right)$$

$$= \sum_{0 \le i \le l} b_i 2^{wi} P = eP.$$

The point multiplication method is a signed-digit variant of Yao's right-to-left method [15] (see also [16, exercise 4.6.3-9]) and [17, exercise 4.6.3-9]) and [18]) with two essential modifications for achieving resistance against side-channel attacks: The randomized initialisation stage is different; and in the right-to-left stage, the digit 0 is treated like any other digit.

DETAILED DESCRIPTION OF THE INVENTION

In the following the three stages are discussed in detail describing possible implementations.

The initialisation stage can be implemented as follows:
1. For each $b \in B' - \{1\}$, generate a random point on the elliptic curve and store it in variable $A_b$.
2. Compute the point $-\sum_{b \in B' - \{0,1\}} b A_b$ and store it in variable $A_1$.
3. For each $b \in B'$, perform a projective randomisation of variable $A_b$.

The resulting values of the variables $A_b$ are denoted by $A_b^{init}$.

If the elliptic curve is fixed, precomputation can be used to speed up the initialisation stage:

The steps 1 and 2 should be run just once, e.g. during personalization of a smart card, and the resulting intermediate values $A_b$ stored for future use.

These values are denoted by $A_b^{fix}$. Then only step 3 (projective randomisation of the values $A_b^{fix}$ to obtain new representations $A_b^{init}$) has to be performed anew each time the initialisation stage is called for. The points $A_b^{fix}$ must not be revealed; they should be protected like secret keys.

Generating a random point on an elliptic curve is straightforward. For each element X of the underlying field, there are zero, one or two values Y such that (X,Y) is the affine representation of a point on the elliptic curve.

Given a random candidate value X, it is possible to compute an appropriate Y if one exists; the probability for this is approximately ½ by Hasse's theorem.

If there is no appropriate Y, one can simply start again with a new X.

Computing an appropriate Y given X involves solving a quadratic equation, which usually (depending on the underlying field) is computationally expensive.

This makes it worthwhile to use precomputation as explained above.

It is also possible to reuse the values that have remained in the variables $A_b, b \neq 1$, after a previous computation, and start at step 2 of the initialisation stage.

To determine $-\sum_{b \in B' - \{0,1\}} b A_b$ in step 2, it is not necessary to compute all the individual products $b A_b$.

The following Algorithm can be used instead to set up $A_1$ appropriately if $B' = \{0, 1, \ldots, \beta\}$, $\beta \geq 2$.

(Note that both loops will be skipped in the case $\beta = 2$.)

---
Algorithm 1 Compute $A_1 \leftarrow -\sum_{b \in \{2, \ldots, \beta\}} b A_b$ in the initialisation stage
--- for i = β − 1 down to 2 do
  $A_i \leftarrow A_i + A_{i+1}$
$A_1 \leftarrow 2 A_2$
for i = 2 to β − 1 do
  $A_i \leftarrow A_i - A_{i+1}$
  $A_1 \leftarrow A_1 + A_{i+1}$
$A_1 \leftarrow -A_1$

---

This algorithm takes one point doubling and 3β−6 point additions.

When it has finished, the variables $A_b$ for $1 < b < \beta$ will contain modified values, but these are representations of the points originally stored in the respective variables.

If sufficient memory is available, a faster algorithm can be used to compute $A_1$ without intermediate modification of the variables $A_b$ for b>1 (use additional variables $Q_b$ instead; a possible additional improvement can be achieved if point doublings are faster than point additions).

The projective randomisation of the variables $A_b(b \in B')$ in step 3 has the purpose to prevent adversaries from correlating observations from the computation of $A_1$ in the initialisation stage with observations from the following right-to-left stage. If algorithm 1 has been used to compute $A_1$ and the points are not reused for multiple invocations of the initialisation stage, then no explicit projective randomisation of the variables $A_b$ for $1<b<\beta$ is necessary; and if $\beta>2$, no explicit projective randomisation of $A_1$ is necessary:

The variables have automatically been converted into new representations by the point additions used to determine their final values.

The following implements the right-to-left stage using a uniform pattern of point doublings and point additions.

Initially, for each b, variable $A_b$ contains the value $A_b^{init}$; the final value is denoted by $A_b^{sum}$.

---
Algorithm 2 Right-to-left stage
---
$Q \leftarrow P$
for i = 0 to l do
  if $b_i \geq 0$ then
    $A_{b_i} \leftarrow A_{b_i} + Q$
  else
    $A_{|b_i|} \leftarrow A_{|b_i|} - Q$
  $Q \leftarrow 2^w Q$
---

Due to special cases that must be handled in the point addition algorithm ([19]), uniformity of this algorithm is violated if $A_{|b_i|}$ is a projective representation of $\pm Q$; the randomisation in the initialisation stage ensures that the probability of this is negligible.

(This is why in the section, where the initialisation stage is described, it is required that precomputed values $A_b^{fix}$ be kept secret.)

If B contains no negative digits, the corresponding branch in the algorithm can be omitted.

The obvious way to implement $Q \leftarrow 2^w Q$ in this algorithm is w-fold iteration of the statement $Q \leftarrow 2 Q$, but depending on the elliptic curve, more efficient specific algorithms for w-fold point doubling may be available (see [20]).

In the final iteration of the loop, the assignment to Q may be skipped (the value Q is not used after the right-to-left stage has finished).

With this modification, the algorithm uses lw point doublings and l+1 point additions. Observe that on two-processor systems the point addition and the w-fold point doubling in the body of the loop may be performed in parallel: Neither operations depends on the other's result.

Similarly to the computation of $A_1$ in the initialisation stage, the result stage computation $$\sum_{b \in B' - \{0\}} b A_b^{sum}$$

can be performed without computing all the individual products $b A_b^{sum}$. In the result stage, it is not necessary to preserve the original values of the variables $A_b$, so the following algorithm (from [16, answer to exercise 4.6.3-9]) can be used if $B'=\{0,1,\ldots,\beta\}$ when initially each variable $A_b$ contains the value $A_b^{sum}$.

---
Algorithm 3 Compute $\sum_{b \in \{1,\ldots,\beta\}} b A_b^{sum}$ when initially $A_b = A_b^{sum}$
---
for i = $\beta$ − 1 down to 1 do
  $A_i \leftarrow A_i + A_{i+1}$
for i = 2 to $\beta$ do
  $A_1 \leftarrow A_1 + A_i$
return $A_1$
---

This algorithm uses $2\beta-2$ point additions. Elliptic curve point arithmetic usually has the property that point doublings are faster than point additions. Then the variant described in the following algorithm is advantageous.

---
Algorithm 4 Compute $\sum_{b \in \{1,\ldots,\beta\}} b A_b^{sum}$ when initially $A_b = A_b^{sum}$ (variant)
---
for i = $\beta$ down to 1 do
  if $2i \leq \beta$ then
    $A_i \leftarrow A_i + A_{2i}$
  if i is even then
    if $i < \beta$ then
      $A_i \leftarrow A_i + A_{i+1}$
    $A_i \leftarrow 2A_i$
  else
    if $i > 1$ then
      $A_1 \leftarrow A_1 + A_i$
return $A_1$
---

This algorithm uses $\lfloor \beta/2 \rfloor$ point doublings and $2\beta-2-\lfloor \beta/2 \rfloor$ point additions.

The invention claimed is:

1. A cryptographic method for performing an elliptic curve point multiplication eP where e is an integer and P is a point on an elliptic curve for use in cryptographic processing device, comprising the following steps:

representing the multiplier e in the form $$e = \sum_{0 \leq i \leq l} b_i 2^{wi}$$

using digits $b_i \in B$ where w and l are integers and B is a set of integers;

assigning randomly selected point representations to variables $A_b$ for at least one but not all $b \in B$, such that none of the selected point representations is the point at infinity;

assigning point representations to variables $A_b$ for all values of b for which randomly selected point representations were not assigned so that the sum $$\sum_{b \in B} b A_b$$

is the point at infinity;

modifying the values of the variables $A_b$ in dependency of the digits $b_i$ such that the sum of the points $2^{wi} P$ over those indexes i for which $b_i=b$ holds is added to each variable $A_b$; and calculating the sum $$\sum_{b \in B} bA_b$$

by using the modified values of the variables $A_b$.

2. A cryptographic method for performing an elliptic curve point multiplication eP where e is an integer and P is a point on an elliptic curve for use in cryptographic processing device, comprising the following steps:

representing the multiplier e in the form $$\sum_{0 \leq i \leq l} b_i 2^{wi}$$

by using digits $b_i \in B$ where w and l are integers and B is a set of integers;

assigning randomly selected point representations to variables $A_b$ for each $b \in B$, such that none of the selected point representations is the point at infinity;

computing the sum $$\sum_{b \in B} bA_b$$

and storing it in a variable Q;

modifying the values of the variables $A_b$ in dependency of the digits $b_i$ such that the sum of the points $2^{wi} P$ over those indexes i for which $b_i = b$ holds is added to each variable $A_b$; and calculating the sum $$\sum_{b \in B} bA_b$$

by using the modified values of $A_b$, and subtracting from it the point stored in variable Q.

3. A cryptographic method for performing an elliptic curve point multiplication eP where e is an integer and P is a point on an elliptic curve for use in cryptographic processing device, comprising the following steps:

representing the multiplier e in the form $$\sum_{0 \leq i \leq l} b_i 2^{wi}$$

using digits $b \in B$ where w and l are integers and B is a set of integers;

assigning randomly selected point representations to variables $A_b$ for at least one but not all $b \in B'$, such that none of the selected point representations is the point at infinity;

assigning point representations to variables $A_b$ for all values of b for which randomly selected point representations were not assigned so that the sum $$\sum_{b \in B'} bA_b$$

is the point at infinity, where B' denotes the set of absolute values of the integers in set B.

modifying the values of the variables $A_b$ in dependency of the digits $b_i$ such that the sum of the points $2^{wi} P$ over those indexes i for which $b_i = b$ holds minus the sum of the points $2^{wi} P$ over those negative indexes i for which $b_i = -b$ holds is added to each variable $A_b$ with $b \in B'$; and calculating the sum $$\sum_{b \in B'} bA_b$$

by using the modified values of the variables $A_b$.

4. A cryptographic method for performing an elliptic curve point multiplication eP where e is an integer and P is a point on an elliptic curve for use in cryptographic processing device, comprising the following steps:

representing the multiplier e in the form $$\sum_{0 \leq i \leq l} b_i 2^{wi}$$

by using digits $b_i \in B$ where w and l are integers and B is a set of integers;

assigning randomly selected point representations to variables $A_b$ for each $b \in B'$, such that none of the selected point representations is the point at infinity, where B' the set of absolute values or the integers in set B;

computing the sum $$\sum_{b \in B} bA_b$$

and storing it in a variable Q;

modifying the values of the variables $A_b$ in dependency of the digits $b_i$ such that the sum of the points $2^{wi} P$ over those indexes i for which $b_i = b$ holds minus the sum of the points $2^{wi} P$ over those negative indexes i for which $b_i = -b$ holds is added to each variable $A_b$ with $b \in B'$; and calculating the sum $$\sum_{b \in B'} bA_b$$

by using the modified values of $A_b$, and subtracting from it the point stored in variable Q.

5. The method according to claim 1, wherein in the modifying step the values $2^{wi} P$ are computed in succession for $i = 0, \ldots, l$ and for each i the respective value is added to variable $A_{bi}$.

6. The method according to claim 3, wherein in the modifying step the values $2^{wi} P$ are computed in succession for $i = 0, \ldots, l$ and for each i the respective value is added to variable $A_{bi}$ if $b_i \geq 0$ and subtracted from variable $A_{-bi}$ if $b_i < 0$.

7. The method according to claim 1, wherein $1 \in B$, and wherein in the assigning randomly selected point representations step random points are assigned to the variable $A_b$ with $b \in B-\{1\}$ and the negative of the value of the sum $$\sum_{b \in B-\{1\}} bA_b$$

is assigned to $A_1$.

8. The method according to claim 7, wherein the points in $A_b$ are described in projective coordinates and wherein at the end of the assigning randomly selected point representations step a projective randomization takes place of the variables $A_b$ with $b \in B-\{1\}$.

9. A device comprising means, configured to provide the method according to the previous independent method claim 1.

10. A device comprising means, configured to provide the method according to the previous independent method claim 2.

11. A device comprising means, configured to provide the method according to the previous independent method claim 3.

12. A device comprising means, configured to provide the method according to the previous independent method claim 4.

13. A computer readable medium comprising computer executable instructions that when executed provide the method according to the previous independent method claim 1 while being executed on a computer.

14. A computer readable medium comprising computer executable instructions that when executed provide the method according to the previous independent method claim 2 while being executed on a computer.

15. A computer readable medium comprising computer executable instructions that when executed provide the method according to the previous independent method claim 3 while being executed on a computer.

16. A computer readable medium comprising computer executable instructions that when executed provide the method according to the previous independent method claim 4 while being executed on a computer.

* * * * *